J. R. BUCHANAN.
HOSE COUPLING.

No. 68,348. Patented Sept. 3, 1867.

Witnesses.
Geo L Chapin
A. Hayward

Inventor.
John R Buchanan

United States Patent Office.

JOHN R. BUCHANAN, OF CHICAGO, ILLINOIS.

Letters Patent No. 68,348, dated September 3, 1867.

---

IMPROVEMENT IN HOSE-COUPLINGS.

---

The Schedule referred to in these Letters Patent and making part of the same.

---

TO ALL WHOM THIS MAY CONCERN:

Be it known that I, J. R. BUCHANAN, of Chicago, in the county of Cook, and State of Illinois, have invented an improved Hose-Coupling; and I do hereby declare that the following is a full, clear, and exact description of the construction and operation of the same, reference being had to the accompanying drawings, and letters of reference marked thereon, making a part of this description, in which—

Figure 1:
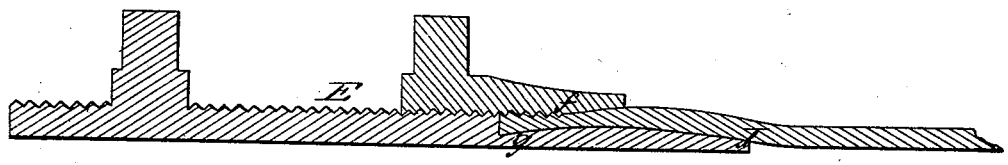
Figure 1:
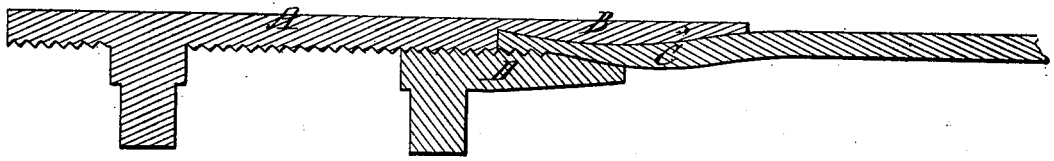

Figure 1 is a central sectional elevation of my improved hose-coupling.

Figure 2:
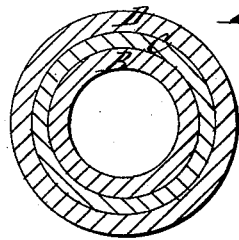

Figure 2, a transverse section of the same, taken through fig. 1, at the line X X.

The nature of my inventio consists in the use of a barrel-shaped thimble, over which the hose is stretched and held in position by means of a nut, having a conical end enlarged to correspond with one end of the thimble, and hold the hose firmly in position. I am well aware that an inner and outer truncated cone has been used as a coupling, but as the inner cone has its smaller end projecting outward from the connection, and as the hose is only held by pressure, it is so liable to get loose that the device is considered practically inoperative. The means now employed, mostly, to couple hose pipe, consists in the use of a corrugated cylinder, over which the hose is put, and afterwards wound with soft wire, or other similar material, but as this method occupies considerable time and skill, much loss by fire often occurs while replacing an imperfect joint of hose.

I claim that my coupling is so simple that any person having sufficient skill to turn a nut and put the hose on the thimble, can couple and uncouple a section of hose in the most perfect manner, and in a very short space of time. This is a very important consideration, for the time between the bursting of a section of hose and its replacement with a new length, may, and does frequently, cause the destruction of much valuable property by fire.

In order to give a correct understanding of my device I have marked each corresponding part with the same letter, and will now give a concise detailed description.

A represents a common cylindrical connection, having a screw-thread, E, upon which the nut D is made to operate when coupling and uncoupling the hose C. This nut is enlarged at $f$, fig. 1, to correspond with the swell at the outer surface of the thimble B, and has a dull screw-thread which embeds itself into hose C when turned outward and against the inclination of B, as seen at fig. 1. The end J of thimble B is made small for the convenience of entering hose C, and is made equally small at $g$ for the purpose of holding the hose in place. This arrangement is important, although simple, and can be made as cheaply as a common cylinder or conical couplings, and has the advantage of holding the hose C sufficiently firm to withstand a strain equal to its strength or tension, which is not the case with any similar device, although it may be cast as cheaply as mine.

Having thus fully described my invention, what I claim and desire to secure by Letters Patent, is—

The combination and arrangement of nut D, barrel-thimble B, and hose C, arranged to operate substantially as and for the purpose set forth.

JOHN R. BUCHANAN.

Witnesses:
GEO. L. CHAPIN,
A. HAYWARD.